United States Patent [19]
Wise et al.

[11] 4,277,341
[45] Jul. 7, 1981

[54] WATER TREATMENT DISCHARGE MEANS

[75] Inventors: William F. Wise, Weyers Cave; Jesse E. Snyder, Jr., Staunton, both of Va.

[73] Assignee: Schramm, Inc., West Chester, Pa.

[21] Appl. No.: 73,029

[22] Filed: Sep. 6, 1979

[51] Int. Cl.³ .............................................. C02F 3/10
[52] U.S. Cl. ................................... 210/602; 210/617; 210/150; 210/220; 210/258; 210/275; 210/903
[58] Field of Search ................... 210/15, 17, 16, 150, 210/151, 220, 275, DIG. 28, 602, 605, 616–618, 620, 630, 258, 903

[56] References Cited

U.S. PATENT DOCUMENTS

| Re. 22,652 | 6/1945 | Reybold | 210/5 |
|---|---|---|---|
| 178,630 | 6/1876 | Grove | 210/65 |
| 1,760,216 | 5/1930 | Stockholder | 210/220 |
| 2,266,386 | 10/1941 | Shafor | 210/7 |
| 2,340,848 | 2/1944 | Reybold | 210/5 |
| 2,594,650 | 4/1952 | Huppertz | 210/98 |
| 2,796,939 | 6/1957 | Woodruff | 210/275 |
| 3,168,465 | 2/1965 | Kraus | 210/16 |
| 3,234,123 | 2/1966 | Hincle | 210/16 |
| 3,412,864 | 11/1968 | Okada | 210/151 |
| 3,511,380 | 5/1970 | Rice | 210/202 |
| 3,575,850 | 4/1971 | Davidson | 210/220 |
| 3,642,134 | 2/1972 | Reckers | 210/73 |
| 3,649,531 | 3/1972 | Brown | 210/16 |
| 3,651,944 | 3/1972 | Shuttleworth | 210/265 |
| 3,701,423 | 10/1972 | Lindstal | 210/275 |
| 3,701,727 | 10/1972 | Kormanik | 210/16 |
| 3,966,599 | 6/1976 | Burkhead | 210/14 |
| 3,966,608 | 6/1976 | Mason | 210/151 |
| 3,968,034 | 7/1976 | Tymoszczuk | 210/8 |
| 3,984,322 | 10/1976 | Peasley | 210/220 |
| 4,009,099 | 2/1977 | Jeris | 210/3 |
| 4,036,754 | 7/1977 | Peasley | 210/139 |
| 4,039,437 | 8/1977 | Smith | 210/150 |
| 4,048,072 | 9/1977 | McCullough | 210/220 |
| 4,053,399 | 10/1977 | Donnelly | 210/44 |
| 4,069,156 | 1/1978 | Mason | 210/DIG. 28 |
| 4,077,877 | 3/1978 | Orensten | 210/17 |
| 4,079,008 | 3/1978 | Neumann | 210/220 |

FOREIGN PATENT DOCUMENTS 247769 3/1925 United Kingdom ..................... 210/17

OTHER PUBLICATIONS

Centrox Aerobic Wastewater Treatment Plants. Norton Chemical Process Products, Bulletin 44-97-7-41.

Primary Examiner—Ernest G. Therkorn
Attorney, Agent, or Firm—Howson and Howson

[57] ABSTRACT

A lagoon for wastewater treatment, having an aeration zone and a quiescent zone is provided with a collector in the form of a horizontally extending submerged tube filled with biological reaction media and having an array of openings on its underside for the entry of water into its interior. The collector tube is supported at its ends by vertical pipe sections extending upwardly from the floor of the lagoon. These pipe sections connect the ends of the collector tube to a discharge conduit. Provision is made for the introduction of air into the collector for backwashing the biological reaction media. The media within the tube, in cooperation with openings designed to produce a velocity gradient within a limited range, insure uniform flow and minimum disturbance of the quiescent zone so that a highly clarified effluent is produced. The biological media also provide a large surface area for the growth of nitrifying bacteria. Backwashing of the media within the collector tube causes nitrate-containing matter to settle on the floor of the lagoon below the collector, where denitrification takes place.

18 Claims, 13 Drawing Figures

WATER TREATMENT DISCHARGE MEANS

BRIEF SUMMARY OF THE INVENTION

This invention relates to water treatment and particularly to improved discharge means for open bodies of water such as lagoons, oxidation ponds, oxidation ditches, carrousels, fish ponds, reservoirs and the like.

It is important, in order to satisfy strict water quality standards, to keep the effluent from such bodies of water relatively free of suspended solids. In those bodies of water in which continuous mixing takes place in the vicinity of the discharge as a result of aeration, solids are kept in suspension and pass out with the effluent. It is therefore frequently necessary to provide a clarifier for further treatment of the effluent. On the other hand, in those bodies of water in which mixing does not take place in the vicinity of the discharge, conditions favorable to algae growth often exist. In an open, quiescent body of water, algae grow in an algal zone which depends on the depth of sunlight penetration. For the purpose of this application the term "algal zone" should be understood as the zone extending from the surface of the water to a depth such that at least 67 percent of the live algae in the body are located above that depth under quiescent conditions. Ordinarily, in a quiescent body of water the algal zone is approximately one meter deep. In a typical body of water having a discharge, algae are carried out in the effluent and result in an increased biochemical oxygen demand which places a burden on the receiving stream, and was in the past difficult to control. The presence of algae in the discharge of a body of water also results in a need for increased amounts of chlorine for disinfection. The use of increased amounts of chlorine may, in turn, result in increased amounts of objectionable chlorine compounds downstream.

The principal object of this invention is to provide a simple and inexpensive, yet highly effective means for achieving very low levels of algae and other suspended solids in the effluent of a large open body of water.

In accordance with the invention, an open body of water is provided with inlet means for directing water into the body and a discharge conduit for carrying water out of the body. The conduit is arranged (ordinarily by providing an outfall at the desired water level) to maintain a substantially uniform water level in the body in normal operation. The body of water must have a substantially quiescent zone, i.e. one in which the velocities of flow are sufficiently low as to allow particulate matter having a density greater than that of water to settle to the bottom and to allow lighter particles to float to the surface. At least one elongated, substantially horizontal collector tube is provided within the body of water. Each such tube has an array of openings providing communication between its exterior and its interior. Substantially all of these openings in each collector tube are confined to the underside of the tube and are of substantially uniform cross-sectional area. Each tube is located with its entire array of openings submerged to a depth below the algal zone and within the quiescent zone. Each tube is provided with means, within its interior, providing labyrinthine passages adjacent substantially all of its openings. These labyrinthine passages promote uniformity of flow of water through the openings into the interior of the tube. The interior of each tube is connected to the discharge conduit.

The size of the openings in the collector tubes, and the total number of openings in the collector tubes in a particular body of water, are chosen so that, at the design flow rate, the velocity gradient G, at each opening, is within the range of approximately 10 to 200 sec$^{-1}$. If the velocity gradient is held within this range, then, at the design flow rate, the velocities at the locations of the collector openings are not so great as to cause entrainment of substantial quantities of suspended solids. At the same time the head losses at the openings are sufficient to promote uniform distribution of flow through all of the openings.

The openings in the collector tubes should be distributed over an area on each tube such that the total area covered by the arrays of openings on all of the tubes is substantially greater than the cross-sectional area of the discharge conduit. The distribution of the openings over a wide area insures that the flow velocity at any point within the quiescent zone will be so low as not to draw significant quantities of algae and other suspended solids into the effluent.

For the purpose of this application, the term "settling zone" should be understood as the zone extending from the floor of the quiescent zone up to a level such that at least 67 percent of the suspended solids in the quiescent zone (not including the sludge layer) are located below that level. Typically, in the quiescent zone of a wastewater lagoon, the settling zone is approximately one meter deep. Preferably, the openings of the collector tubes are located substantially above the settling zone so that relatively little of the settled sludge is drawn into the effluent.

The invention produces a high quality effluent. In the case of wastewater treatment lagoons, oxidation ponds, oxidation ditches, carrousels and fish ponds, the effluent may be delivered directly to a natural stream without further treatment. In the case of a reservoir, the reduction of the suspended solids and the substantial elimination of algae in the effluent reduces the loading in the treatment process and subsequent disinfection.

The invention has particular utility in wastewater treatment using facultative aerated lagoons, i.e. lagoons in which both aerobic and anaerobic biological treatment take place. These lagoons have found considerable use in secondary wastewater treatment for small municipalities and industrial plants. They are also used for polishing or final treatment of the effluent from secondary treatment facilities of various types. It is a further object of the invention to provide an improved wastewater treatment system capable of producing an effluent having a very low suspended solids level.

In a typical facultative aerated lagoon system, mechanical or diffused-type aerators are provided in a first zone to encourage aerobic biological treatment. A quiescent zone in which settling takes place is also provided within the lagoon system. Solids are allowed to settle to the floor of the quiescent zone, and anaerobic biological treatment takes place within the settled sludge. Because of the dissolved oxygen introduced into the wastewater by aeration, and the absence of mixing in the quiescent zone, conditions are frequently favorable for the growth of algae within an algal zone extending from the surface of the water to a depth of as much as one meter below the surface. In a facultative lagoon of the type described, the submerged tubes deliver a high quality effluent which is relatively free of algae and other suspended solids, and suitable for discharge into a natural stream without further clarification or other treatment, except for disinfection where required.

A still further object of the invention is to provide a relatively inexpensive wastewater treatment system which is not only capable of producing an effluent low in suspended solids, but which is also capable of removing nitrogenous materials from the wastewater. Particularly in the treatment of municipal wastewater, organic nitrogen is present in undesirable quantities in the form of urea, ammonia and similar compounds. This invention readily lends itself to the denitrification of the wastewater by biological action within a system.

In order to effect denitrification within a facultative aerated lagoon system, the horizontal collector tubes are filled with biological reaction media providing a large surface area for the attached growth of nitrifying bacteria, i.e. bacteria which oxidize the ammonia nitrogen in the wastewater to produce nitrates. The biological reaction media typically consists of packed thermoplastic rings or saddles, on which the nitrifying bacteria grow.

In a facultative aerated lagoon, the low carbonaceous BOD at the point of discharge, and the relatively high dissolved oxygen at that point provide conditions favorable to the growth of nitrifying bacteria. Most lagoons of this type are about three meters or more in depth, and therefore the relatively high ratio of depth to lagoon surface area aids in maintaining the higher temperatures which promote the growth of nitrifying bacteria. Accordingly, except in winter, when temperatures in the lagoon may be too low for adequate nitrification to take place, the nitrifying bacteria grow as a fixed film on the biological reaction media, and serve to remove nitrogen-containing compounds from the effluent.

In order to complete the dentrification process in this system, provision is made to backwash the biological reaction media, preferably by blowing air into the collector tubes to force liquid downwardly through the arrays of holes. Backwashing of the media causes the nitrate-containing matter on the reaction media to pass downwardly through the holes and settle on the bottom of the quiescent zone of the lagoon below the collector tubes. Denitrification, which involves the reduction of nitrates to gaseous nitrogen, takes place by anaerobic bacterial action in the sludge which collects at the bottom of the quiescent zone on the floor of the lagoon.

Thus, by providing collector tubes in accordance with the invention in a facultative lagoon, using a biological reaction media within the collector tubes, and providing for periodic backwashing, the lagoon system can easily be provided with the capability of effecting nitrogen removal from wastewater in addition to its basic capability of providing an effluent having an extremely low level of suspended solids.

The media-filled tubes provide an ideal form of collector, since they can be factory-assembled as standard units and can be easily installed at any desired height in a body of water in a wide variety of configurations. It is therefore a still further object of the invention to provide a collector system which is highly versatile, inexpensive to construct, and easy to install. Still another object is to provide a collector system which is capable of being operated over a long period of time with minimum requirements for maintenance. These and other objects of the invention will be more apparent from the following detailed description, when read in conjunction with the drawings.

DETAILED DESCRIPTION

Figure 1:
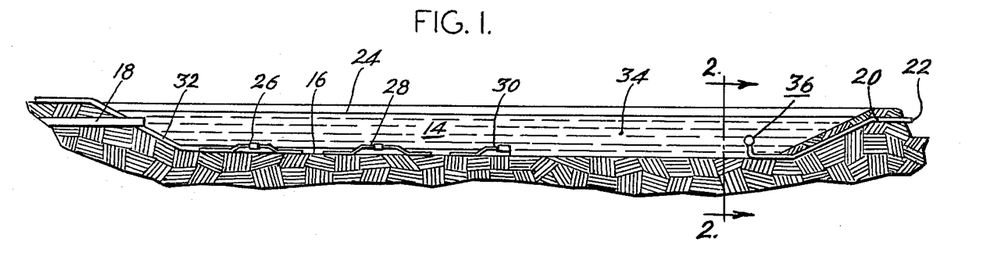
FIG. 1 is a longitudinal section, taken on a vertical plane, through a typical aerated facultative lagoon constructed in accordance with the invention.

The general configuration of lagoon 14, shown in FIG. 1, is typical of lagoons presently in use for the secondary or tertiary treatment of municipal sewage. The lagoon is an earthen lagoon having a generally flat bottom 16 and sloping walls. An inlet pipe 18 delivers wastewater into lagoon 14, and wastewater is discharged from the lagoon through a discharge conduit 20, the outfall 22 of which is arranged so that the water in the lagoon is maintained at a substantially uniform level, indicated by surface 24.

The influent, delivered through inlet pipe 18 to the lagoon, is ordinarily taken from a primary treatment apparatus (consisting of a screening device), or from secondary treatment systems such as other lagoons, extended aeration treatment systems, or activated sludge systems. The effluent from discharge conduit 20 is typically delivered through a disinfection facility and thence to a natural stream or other body of water.

Lagoon 14 is typically rectangular in shape, and elongated in the direction from inlet to discharge.

Diffused aerators 26, 28 and 30 are arranged in a desired pattern on the floor 16 of the lagoon, and are fed with air through an air header 32 from a compressor (not shown). The aerators may be of the type described by J. Robert McCullough in his U.S. Pat. No. 4,048,072, dated Sept. 13, 1977. The entire disclosure of the McCullough patent is incorporated by reference. The McCullough aerator comprises a central manifold having a number of tubes extending outwardly from it in radial directions along the floor of a lagoon. These tubes, which can be perforated plastic tubes or specially constructed woven fabric diffusers, release bubbles of air which produce interfering flow patterns at the surface. The interfering flow patterns produce an outwardly-directed surface flow of aerated water. The outwardly-directed flow of aerated water carried oxygen to the water overlying the sloping sides of a lagoon to prevent short-circuiting, that is to prevent substantial quantities of water from passing from the inlet to the outlet of the lagoon without being exposed to dissolved oxygen.

In FIG. 1, aerators 26, 28 and 30 are arranged on the floor of the lagoon with aerator 30 well-spaced from the discharge end of the lagoon so that a quiescent zone 34 is provided adjacent the discharge end. The flow velocities within the quiescent zone are relatively low, since there are no diffusers in that zone releasing bubbles and causing circulation of water. It may be desirable to arrange the diffuser arms of the aerator nearest the discharge end in such a way as to minimize surface flow toward the discharge end. This can be accomplished, for example, by eliminating those arms on aerator 30 which extend toward the discharge end of the lagoon.

Figure 2:
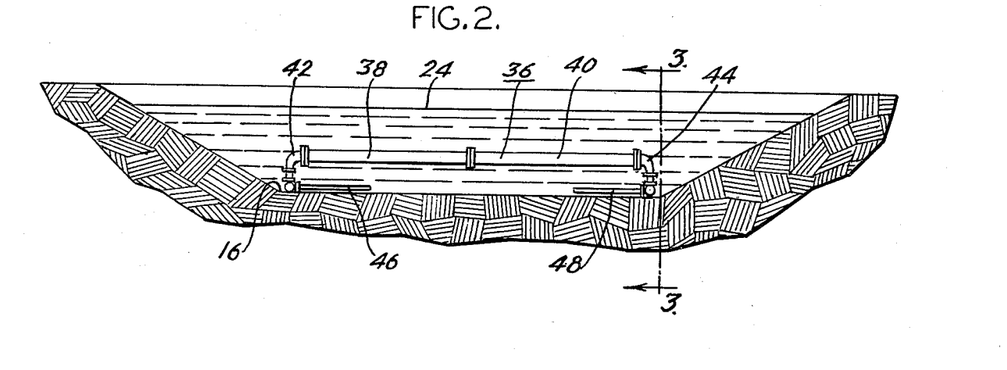
FIG. 2 is a transverse section, taken on the plane 2—2 of FIG. 1, and illustrating the configuration and arrangement of a typical collector system constructed in accordance with the invention.
Figure 3:
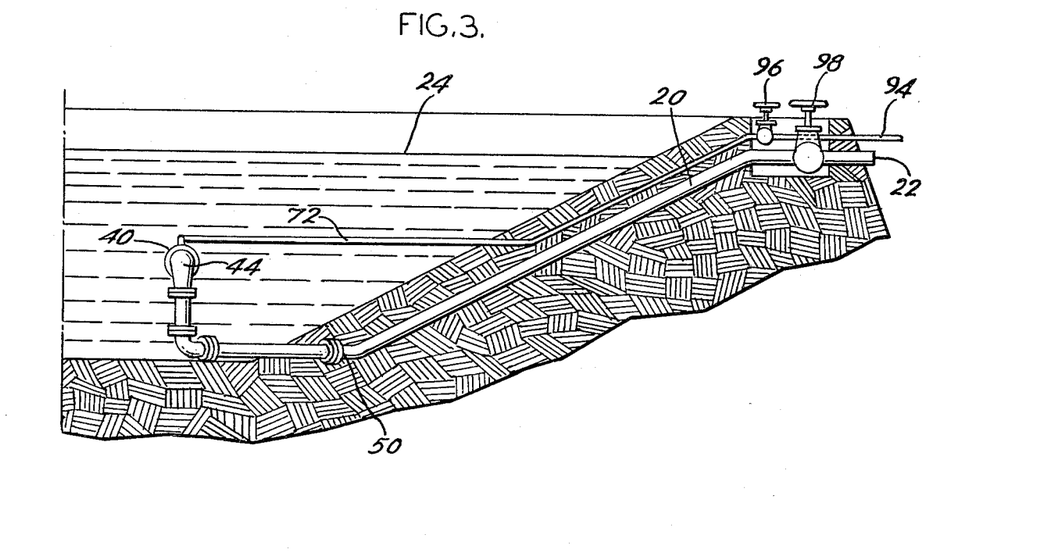
FIG. 3 is a fragmentary longitudinal section of the lagoon taken on the plane 3—3 of FIG. 2.

Discharge conduit 20 is connected to a submerged collector 36, which is located within quiescent zone 34, and comprises a pair of elongated, substantially horizontally extending tubes 38 and 40 (FIG. 2). Tubes 38 and 40 are preferably, although not necessarily, in the form of circular cylinders, and are connected end-to-end, and are supported at a location above floor 16, but below surface 24, by reducing elbows 42 and 44 located respectively at the opposite ends of the connected tubes 38 and 40. Elbows 42 and 44 are connected respectively to pipes 46 and 48 which extend along the floor of the lagoon and converge at a Y connection 50, buried underneath the earthen wall at the discharge end of the lagoon, as indicated in FIG. 3. Conduit 20 extends from Y connection 50 upwardly in an inclined direction underneath the sloping wall of the lagoon at the discharge end.

Figure 4:
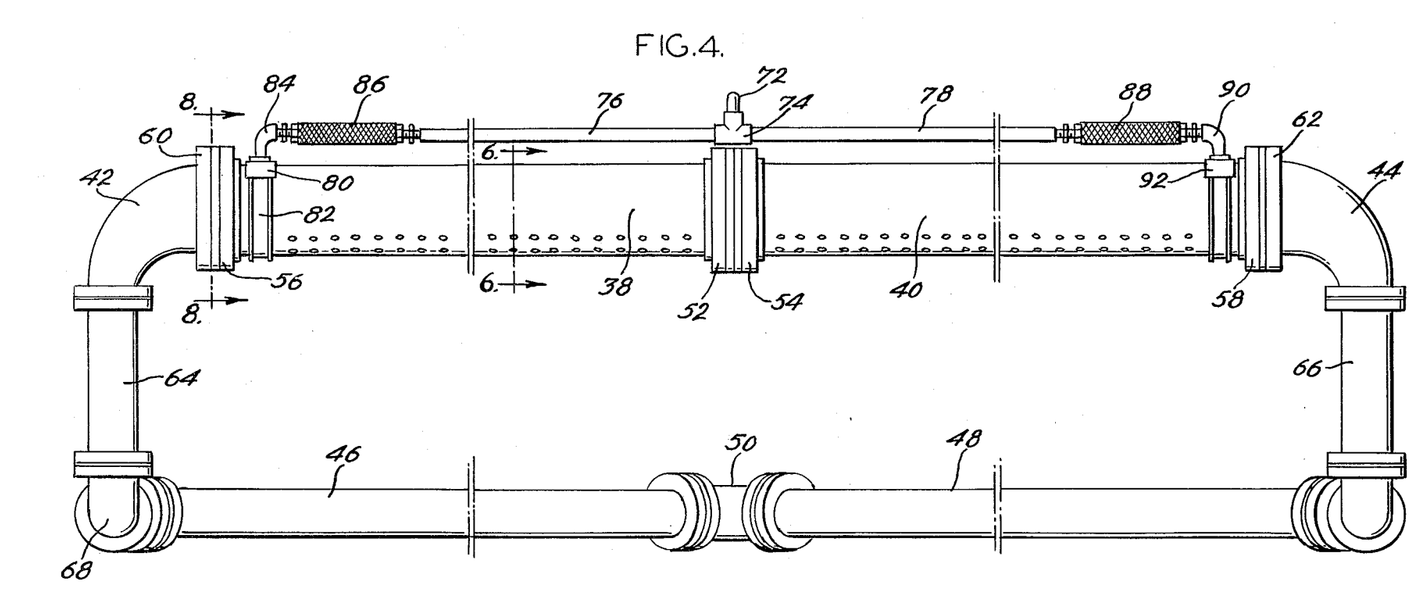
FIG. 4 is an enlarged elevational view of the collector system as viewed in FIG. 2.
Figure 5:
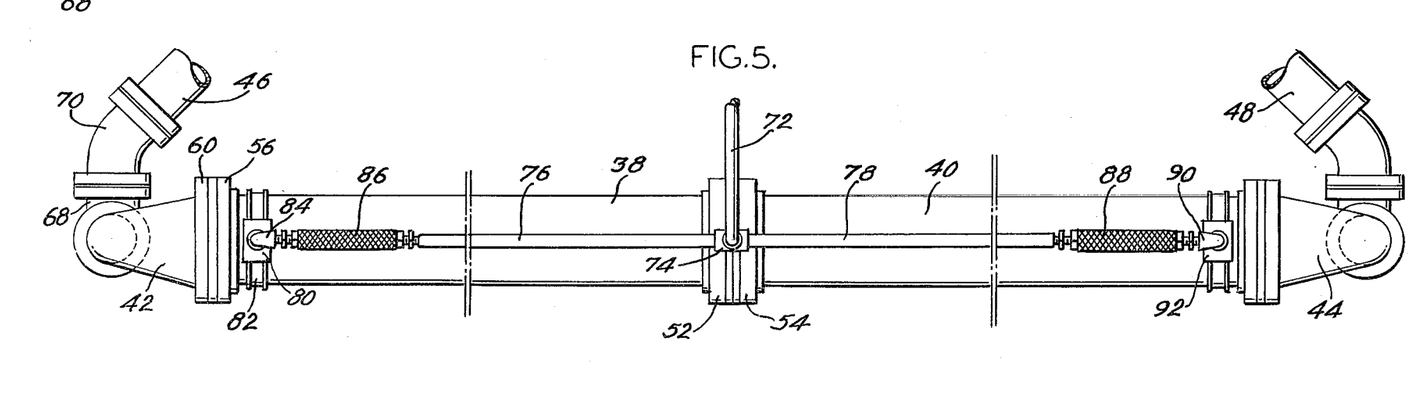
FIG. 5 is a fragmentary top plan view of the collector system of FIG. 4.

From FIG. 4, it will be seen that tubes 38 and 40 are substantially identical, and that each is provided on its underside with an array of holes providing communication between the interior and the exterior of the tubes. Tubes 38 and 40 are preferably PVC (polyvinyl chloride) pipe, and typically have an internal diameter of twelve inches and a nominal wall thickness of one-half inch. Pipes 38 and 40 are provided with flanges 52 and 54, which are bolted together. Flanges 56 and 58 at the outer ends of the collector assembly are bolted respectively to flanges 60 and 62 of the reducing elbows. The reducing elbows are connected to vertical pipe sections 64 and 66. The bottom end of vertical pipe section 64 is connected to horizontal pipe 46 through a ninety degree elbow 68 and a forty five degree elbow 70 (FIG. 5). The lower end of pipe section 66 is similarly connected to horizontal pipe 48.

Partially buried pipes 46 and 48, together with vertical pipe sections 64 and 66 and elbows 42 and 44 provide an exceptionally simple yet strong support enabling the collector tubes 38 and 40 to be positioned at the desired intermediate depth within the lagoon. The vertical pipes transfer the weight of the collector tubes directly to the lagoon floor and thereby provide adequate support for the collector tubes even when the lagoon is empty of water. The buried section of pipe prevent the collector tubes from floating upwardly when they become filled with air in the backwashing process.

While the collector pipes 38 and 40 are preferably made of PVC, the reducing elbows and the piping connecting the reducing elbows to the discharge conduit are preferably ductile cast iron in order to provide more weight to counteract the buoyancy of the collector assembly when it is filled with air during backwashing.

Air for backwashing the collector is supplied through a pipe 72, which is connected through a T connector 74 to horizontal pipes 76 and 78, which extend outwardly along the upper side of the collector assembly as shown in FIGS. 4 and 5. Pipe saddle 80, located on collector tube 38 near the outer end, is secured to tube 38 by a strap 82, and provides communication to the interior of tube 38 through a small connecting elbow 84. Elbow 84 is connected to air pipe 76 through a short length 86 of tubular woven fabric of the type used in the air diffusers of McCullough U.S. Pat. No. 4,048,072. Air pipe 78 is similarly connected to collector tube 40 through a section 88 of woven fabric, a connecting elbow 90 and a saddle 92. The purpose of the woven fabric sections is to allow air to be introduced into the collector assembly when the air supply is turned on, and to permit air to bleed out of the collector assembly slowly when the air supply is turned off. The slow bleeding of air is important in order not to draw large quantities of suspended solids into the interior of the collector following backwashing.

Returning to FIG. 3, it will be seen that air pipe 72 is connected to air supply line 94 through air valve 96, and that discharge conduit 20 is connected to outfall 22 through valve 98.

Figure 6:
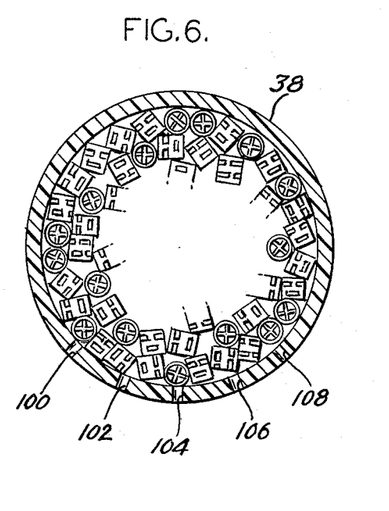
FIG. 6 is a vertical section of a collector tube taken on the plane 6—6 of FIG. 4.
Figure 7:
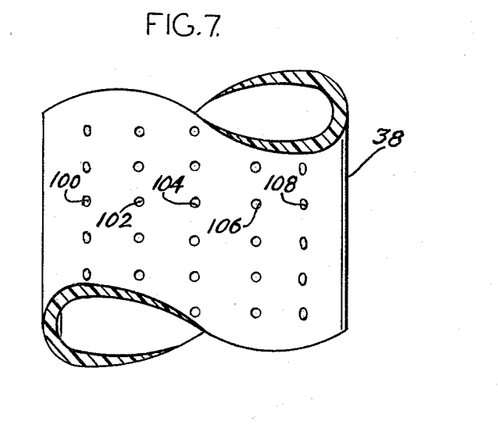
FIG. 7 is a fragmentary bottom plan view showing the details of the array of openings on the underside of a collector tube.

The details of the collector tubes are shown in FIGS. 6 through 10. Collector tube 38, in FIG. 6 is shown with openings 100, 102, 104, 106 and 108 arranged on its underside so that flow of liquid into the interior of tube 38 is required to take place in upward directions. This arrangement of openings is desirable in order to minimize the likelihood of entry into the collector of algae of other suspended solid particles which are in the process of settling in the quiescent zone of the lagoon. The openings in each collector tube are preferably distributed uniformly, as indicated in FIG. 7, over a large area on the underside of the tube. Typically, in a tube of circular cross-section, the array of openings subtends an angle of about ninety degrees, and extends substantially the full length of the tube, as indicated in FIG. 4. The angle subtended by the array of openings should not exceed approximately 180 degrees in a circular tube, and regardless of the cross-sectional shape of the tube, substantially all of the openings should be on the underside of the tube. The openings are of uniform size and are typically $\frac{1}{4}$ inch in diameter, though they may be somewhat larger or smaller. However, the openings should not be so large as to allow the biological reaction media to fall out of the tubes. Nor should they be so small as to be easily clogged. For optimum opertion of the system, the range of sizes of the openings is further limited by the need to achieve a velocity gradient in the range from 10 to 200 $sec^{-1}$, as will be discussed in detail below.

Figure 8:
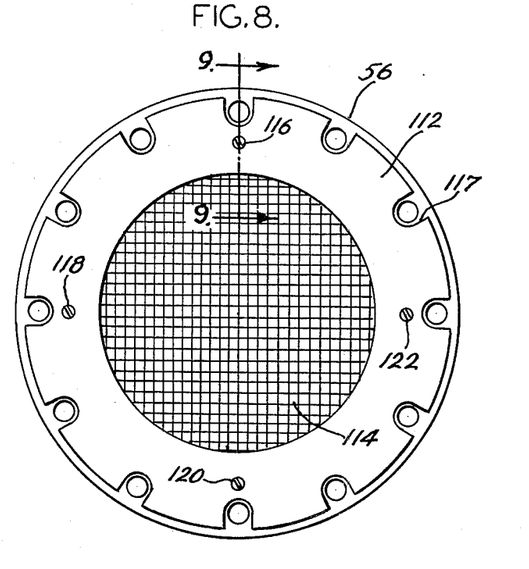
FIG. 8 is a vertical section taken on the plane 8—8 of FIG. 4, illustrating the details of a screen and plate assembly provided at the end of a collector tube for retaining the biological reaction media within the tube.
Figure 9:
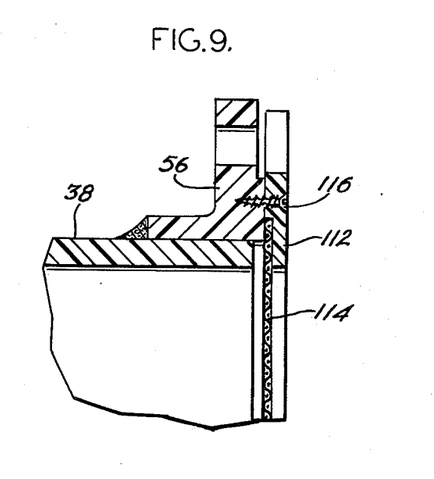
FIG. 9 is a vertical section on the plane 9—9 of FIG. 8.
Figure 10:
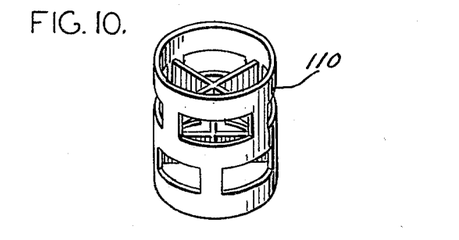
FIG. 10 is a perspective view of a typical biological reaction media element.

The biological reaction media consists of randomly packed rings, saddles or other media providing a large surface area for the growth of nitrifying bacteria. Various types of biological reaction media are known in the art, including thermoplastic and ceramic elements of the kind frequently used in trickling filters. One suitable form of growth medium is the polyethylene biological reaction media sold by Norton Chemical Process Products under the trademark ACTIFIL. A typical ACTIFIL ring 110 is shown in FIG. 10. These rings are typically cylindrical in form having an overall length of one inch and a diameter of one inch. They have side openings and internal ribs, and typically provide a surface area of at least thirty-one square feet per cubic foot of packed media. As polyethylene biological reaction media tend to float in water, it is essential for optimum operation of the collector that the tube be substantially completely filled with the media, as indicated in FIG. 6. The tubes can be supplied from the factory already filled with media so that it is not necessary to attempt to fill the tubes with the media in the process of their installation. To this end, each collector tube is provided with a screened end plate at both of its ends, as illustrated in FIGS. 8 and 9. An annular end plate 112 with a stainless steel screen 114 cemented to it to completely cover its central opening, is secured to flange 56 of collector tube 38 by means of countersunk stainless steel screws 116, 118, 120 and 122. Plate 112 has a series of notches at its periphery (one such notch being indicated at 117) to permit the passage of bolts for interconnecting the flanges of the assembly. Each collector tube is supplied filled with biological reaction media and with an end plate and screen at both of its ends to hold the filter media in place. Assembly of the collector system, therefore requires only the bolting together of the various collector tubes and pipes, without the need for on-site handling of the individual media elements.

In the operation of the collector system just described, water from the quiescent zone flows upwardly into the interior of the collector tube assembly through the arrays of openings, and thence outwardly through reducing elbows 42 and 44, and downwardly through pipe sections 64 and 66, and horizontal pipes 46 and 48 to outlet conduit 20.

An important function of the biological reaction media within the collector tubes is to provide a restriction of flow through the openings in the underside of the collector tubes to insure an even distribution of flow through all of the openings into the interior of the tubes. If the filter media were not present in the immediate vicinity of the openings, water would tend to flow into the collector at a faster rate through some openings than through others. The reason for this phenomenon is that, in the absence of the media, internal flow of water within the collector would tend to induce flow inwardly through openings near the outer ends of the collector. Thus the rate of flow of water through the openings near the ends of the collector would be greater than that through the openings near the center of the collector. The resultant uneven distribution of flow would therefore produce higher velocities of flow in the vicinity of the ends of the collector. These higher velocities would, in turn, tend to entrain algae from above the collector, and solids from the zone below the collector and cause them to flow through these outermost openings into the collector, and from there to the effluent. The biological reaction media, by insuring an even distribution of flow through the entire array of openings, insure that the flow velocities in the vicinity of the collector are maintained at the lowest possible level at all points, for the minimum entrainment of solids into the collector.

For optimum operation of the collector system in any body of water, the collectors should be located at a depth such that the entire array of openings is located below the algal zone, but above the settling zone. As mentioned previously, in a typical body of water, the algal zone extends to a depth of approximately one meter. Therefore, the collector in a body of water having an algal zone one meter in depth should be submerged to a depth such that its openings are at least one meter below the surface. Positioning the openings at a depth of at least one meter produces a significant reduction in the entrainment of algae into the effluent. For optimum results, however, it is desirable to position the collectors so that their openings are at least two meters below the surface where live algae will normally be present only in very low concentrations.

At the same time, it is important to avoid the entrainment of solids from the settlement zone. This is particularly true in wastewater treatment in a facultative lagoon where solids tend to concentrate in a settlement zone extending from the floor of the lagoon up to about one meter above the floor. In such a lagoon, it is desirable to position the collectors so that the arrays of openings are at least one meter above the floor of the lagoon.

In a typical facultative aerated lagoon, having a normal water depth of about three meters, optimum results in terms of minimizing algae and other suspended solids in the effluent, are achieved when the arrays of openings are positioned about two meters below the surface and one meter above the floor of the lagoon. In a deeper lagoon, the openings should be positioned between a depth of two meters below the surface and a depth of one meter above the floor. The collector system may be used in shallower lagoons, or oxidation ponds, though in such cases a compromise normally has to be made between the depth below the surface and the height above the floor. In reservoirs, normally the position of the openings in the collector will favor the reduction of algae, as other suspended solids will normally be filtered out in subsequent filtration.

The size of the collector openings and the number of such openings in a particular body of water should be chosen in accordance with the design flow rate with two particular criteria in mind. First, at the design flow rate, there must be a sufficient head loss at each opening to insure uniform distribution of flow over the entire array of openings, since the biological reaction media cannot do so by themselves. Secondly, the velocities of flow of water through the openings to the interiors of the collector tubes should not be so great as to entrain substantial quantities of suspended solids into the interiors of the collectors.

The head loss and velocity requirements of the collector openings can be conveniently described by the term "velocity gradient", which represents the work done by shear forces acting on a liquid as it passes through an orifice. For the purpose of this application, the velocity gradient G at a particular collector opening is defined as the maximum space rate of change of velocity in a direction normal to the flow through the opening. For a detailed discussion of the concept of "velocity gradient", reference should be made to Camp, T. R. and Stein, P. C. *Velocity Gradients and Internal Work in Fluid Motion,* Journal of the Boston Society of Civil Engineers, October, 1943.

Velocity gradients in the collector system are determined primarily by flow and opening size, and are affected somewhat by temperature. They should be within the range of about 10 $sec^{-1}$ to 200 $sec^{-1}$ in order to satisfy the head loss and velocity criteria referred to above. Preferably, the velocity gradient is between approximately 10 $sec^{-1}$ and 100 $sec^{-1}$, since flow velocities in the vicinity of a collector operating at a velocity gradient substantially in excess of 100 sec$^{-1}$ may be such as to entrain significant quantities of solids from the settling zone below the collector when the collector is located very close to or within the settling zone.

By way of example, at a temperature of 21° C., with circular openings ¼ inch in diameter and ½ inch in length, the velocity gradient will be within the desired range of 10 to 200 sec$^{-1}$ for flow rates between approximately eleven and 220 gallons per day per opening. For openings ⅛ inch in diameter, the velocity gradient will be within the desired range for flow rates between about 1.3 and 26 gallons per day per opening. For openings ⅜ inch in diameter the flow rate should be between about 34 and 670 gallons per day per opening. The size and numbers of openings should be chosen accordingly. It should also be kept in mind that openings appreciably smaller than 1/16 inch may tend to become clogged, so that there is a practical lower limit on the sizes of the openings. Of course, the openings should not be so large that the biological reaction media can fall through them.

In a well-designed lagoon, the discharge conduit is large enough to avoid excessive frictional losses, yet not so large as to waste material. The size of the discharge conduit provides a practical guide for choosing the number of openings in the collector tubes. If the openings are circular openings ¼ inch in diameter, and the total area of the openings in the collector tube is approximately equal to the minimum cross-section of the discharge conduit, then the velocity gradients at the openings will normally be within the desired range of approximately 10 to 200 sec$^{-1}$.

While the number and size of the collector openings should be selected to produce a velocity gradient between approximately 10 and 200 sec$^{-1}$ at the design flow rate, the actual flow may, of course, be below the design flow, and the velocity gradient G may be below 10 sec$^{-1}$. The fact that G may be below 10 sec$^{-1}$, may result in some nonuniformity of flow distribution. However, at flow rates corresponding to a velocity gradient less than 10 sec$^{-1}$, there is no serious deterioration in system performance, since the flow velocities in the liquid in the vicinity of the collector tubes will be sufficiently low as not to entrain suspended solids in appreciable quantities.

The array of openings should be distributed over a wide area within the quiescent zone to avoid entrainment of suspended solids. Preferably, the openings are distributed over an area on each tube such that the total area of the arrays of openings is substantially greater than the cross-sectional area of the discharge conduit.

In any collector tube, or array of collector tubes using a common supply of backwashing air, all of the openings in the collector tubes should be substantially at the same level to insure proper backwashing. If the arrays of openings in two collector tubes are positioned at different levels for any reason, measures must be taken to insure that the pressure of the backwashing air delivered to the lower of the two tubes is adequate to effect complete backwashing.

An example of a typical collector system having the configuration shown in FIGS. 1 through 5 is as follows. Each of collector tubes 38 and 40 is fifteen feet in length, with an internal diameter of twelve inches and a nominal wall thickness of one half inch. Each collector tube has an array of 360 one quarter inch holes uniformly distributed on two inch centers over an area on the outer surface of the tube having a width of approximately ten inches measured circumferentially and 144 inches measured longitudinally. Thus, the area of the array of holes on each collector tube is approximately 1,440 square inches, for a total of 2,880 square inches for both tubes.

The total area of all of the quarter inch holes in the collector system is 35.35 square inches. The minimum diameter of the discharge conduit is six inches, so that its minimum cross-sectional area is 28.27 square inches. Thus, the total area of the holes is nearly equal to the minimum cross-sectional area of the discharge conduit, and the total area of the arrays of holes is far in excess of the minimum discharge conduit cross-section.

Municipal wastewater treatment systems are typically designed to handle 100 gallons per day per person based upon the population expected in twenty years. A typical design flow rate for a lagoon having the specific collector system just described is 80,000 gallons per day, or 4000 gallons per day per square foot of area in the array of collector openings. At this flow rate, the flow velocities in the quiescent zone in the vicinity of the collector are sufficiently low as not to entrain significant quantities of algae or other suspended solids into the collector, assuming that it is positioned below the algal zone and above the settling zone in the lagoon. The velocity gradient G is approximately 100 sec$^{-1}$ at each opening, thus insuring a uniform distribution of flow. The particular collector system is capable of handling flow rates somewhat in excess of 80,000 gallons per day successfully. However, if the flow rate is expected to exceed 160,000 gallons per day by a significant amount, the area covered by the collector openings should be increased by providing additional collector tubes, or by using longer collector tubes, or by increasing the size of the collector openings.

In moderate temperatures, as wastewater flows through the biological reaction media in the collector tubes, nitrifying bacteria grow on the surface of the media as an attached film. The moderate temperatures, low carbonaceous B.O.D. and high dissolved oxygen at the location of the collector tubes are favorable to the growth of these bacteria. The bacteria therefore oxidize nitrogenous compounds in the wastewater, producing a nitrate-containing film on the media.

In the operation of the lagoon, a biomass forms on the undersides of the collector tubes. The biomass serves as a biolocial filter, and aids the collector tubes in preventing suspended solids from passing into the lagoon effluent. The biomass tends to be self-distributing in that it grows faster at the locations of the collector openings at which the flow rate is higher. Thus, while the growth of the biomass tends to increase the velocity gradients at the collector openings, the increase takes place gradually and generally uniformly at all of the collector openings.

Periodically, after nitrifying bacteria build up on the reaction media within the collector tubes and biomass builds up on the exterior of the collector tubes, the collector tubes are backwashed. Periodic backwashing is effected by the introduction of air through backwashing line 72. The air introduced through the backwashing line purges water from the interior of the collector. The water flows downwardly through the array of openings, carrying with it any solids which may have collected within the tubes, including a portion of the nitrified film which has formed on the biological filter media within the collector. The heavier portions of the solids discharged by backwashing settle as a sludge on the floor of the lagoon below the collector, and denitrification takes place in the sludge layer on the floor of the lagoon by anaerobic action. As soon as air bubbles begin to be released from the collector openings during the backwash cycle, they induce an upward flow of water which entrains the lighter discharged solids and carries them to the surface.

The air used for backwashing may, of course, be derived from the same compressor which is used to operate the aerators, assuming that diffused aeration is used. Valve 98 should be closed before the supply of backwashing air is turned on, and should remain closed, following backwashing, until the solids stirred up by the backwashing process have had an opportunity to settle and the normal algal and settling zones are reestablished. Otherwise the normal discharge flow would carry excessive solids into the collector.

When backwashing is completed, and air in line 72 is cut off, air is automatically bled out of the collector tubes at a very slow rate through woven fabric sections 86 and 88. The slow bleeding of air insures against rapid reentry of water into the collector and prevents entrainment of large quantities of suspended solids into the collector immediately following backwashing.

Figure 11:
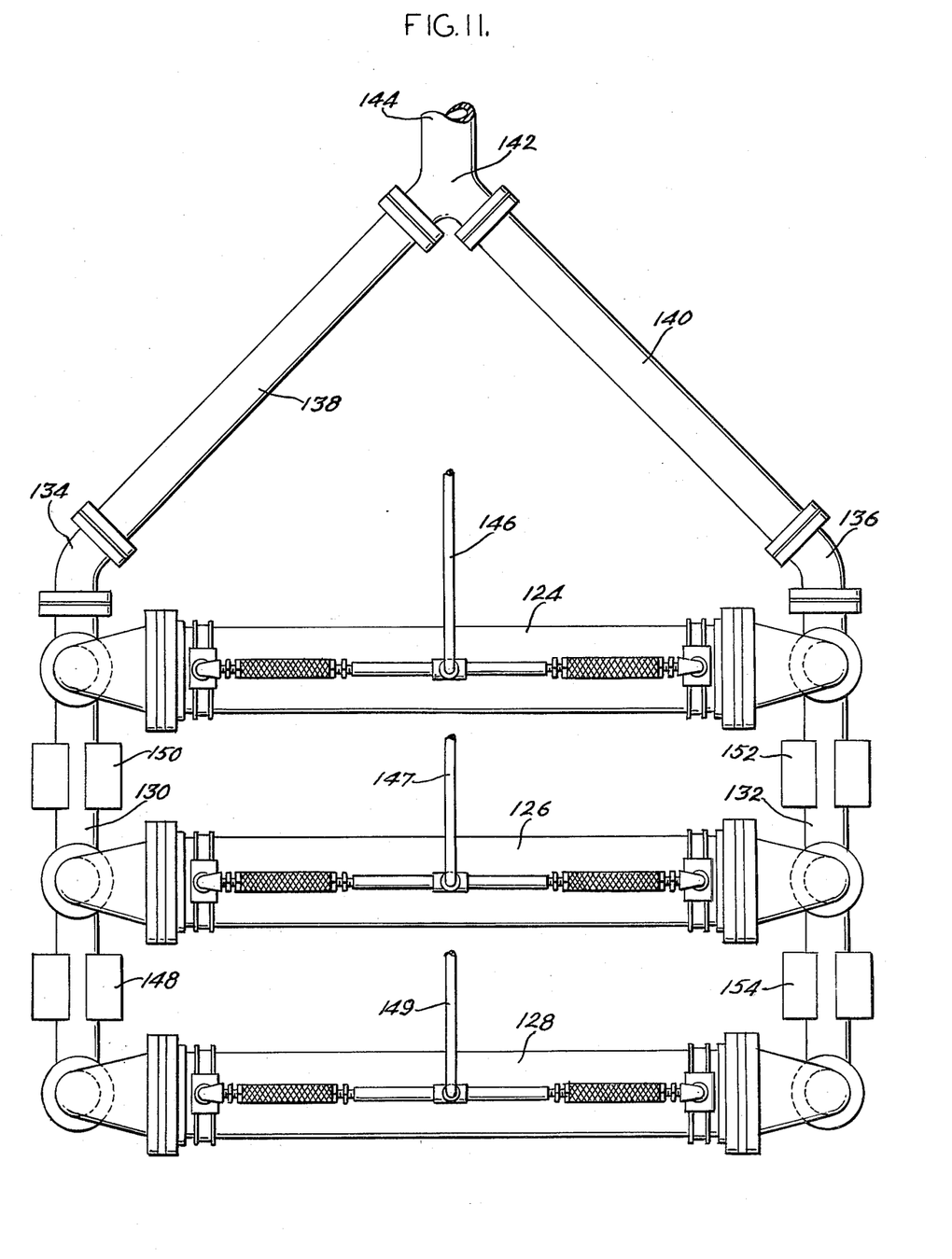
FIG. 11 is a top plan view of an alternative collector in accordance with the invention comprising a plurality of collector tubes connected in parallel.

The alternative collector system of FIG. 11 comprises three collector tubes 124, 126 and 128 arranged in parallel. The ends of the collectors are connected through reducing elbows and vertically extending pipes to headers 130 and 132. The headers are connected through forty five degree elbows 134 and 136 and pipes 138 and 140, and through a Y connector 142 to discharge conduit 144. Air for backwashing is supplied to the collector tubes through backwash lines 146, 147 and 149. It is preferable to have a separate backwash line for each collector tube so that each collector tube can be backwashed independently of the others. With a common backwash line a collector tube with a lower resistance to backwashing flow would be favored by the backwash system and could prevent effective backwashing of the other collector tubes. This arrangement of collector tubes is especially suited for long, narrow lagoons having relatively high rates of flow. Where the collector tubes are arranged in parallel in this manner, the aeration apparatus in the lagoon should be arranged to provide a relatively large quiescent zone. Since the bouyant force on this type of collector system is quite large when the collector tubes are filled with air during backwashing, it is desirable to form heavy concrete anchor blocks about pipes 130 and 132. Anchor blocks can be provided for example at 148, 150, 152 and 154.

Figure 12:
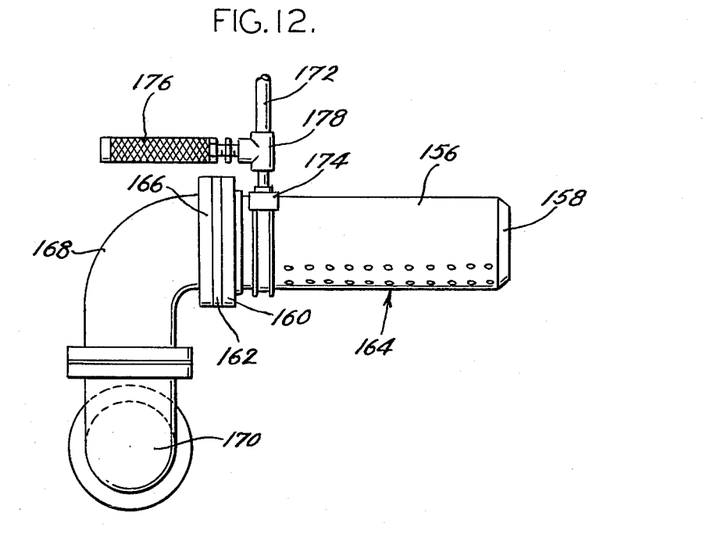
FIG. 12 is an elevational view of another alternative collector system in accordance with the invention.

The collector of FIG. 12 is suitable for smaller installations, or for larger lagoons of irregular shape where it is necessary to use several collectors at widely spaced positions. The collector of FIG. 12 comprises a relatively short (e.g. three feet long) collector tube 156 having an end closure 158 at one end, and a flange 160 at the opposite end. A screen plate, corresponding to the one shown in FIG. 8, is provided at 162. An array of holes 164 is provided on the underside of the collector. Flange 160 mates with flange 166 of elbow 168. Water is carried downwardly through elbow 168 and a mating elbow 170 to a discharge conduit. Air line 172 is connected to deliver air to the interior of collector tube 156 through saddle 174, and a short length of woven tubing 176 is connected to air line 172 through T connection 178. It will be noted at this point that the length of woven material used for bleeding air out of the collector following backwash can be connected in any installation in either of two ways. That is, it can be arranged so that air can be delivered from the air line through the woven fabric tube to the interior of the collector tube, as illustrated in FIG. 4. Or, the fabric tube can be connected as shown in FIG. 12 with only one end in communication with the air line. The manner in which the fabric tube is connected to the air line makes little difference in the overall operation of the collector during and following backwashing.

Figure 13:
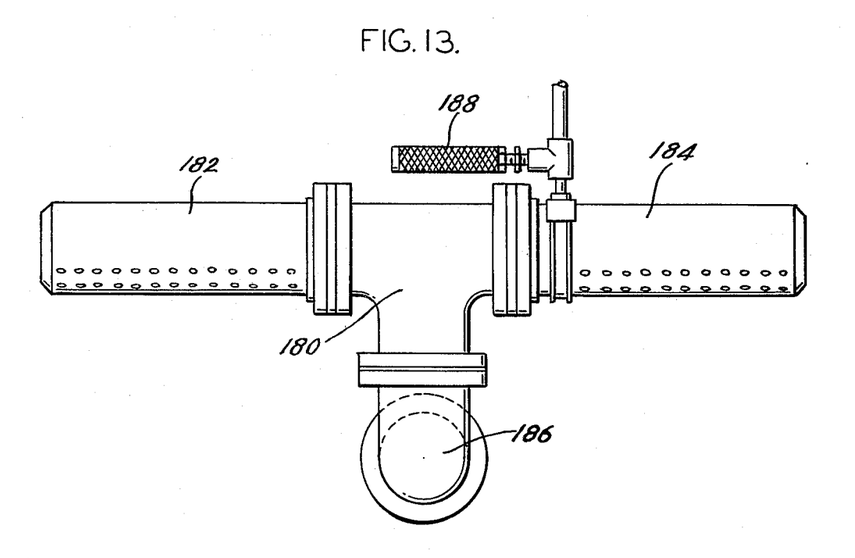
FIG. 13 is an elevational view of still another alternative collector system in accordance with the invention.

The arrangement shown in FIG. 13 is similar to that in FIG. 12, and has similar uses. It comprises a large T connection 180, having short collector tubes 182 and 184 extending horizontally outwardly from its opposite ends. The downwardly extending leg of the T connection is connected through an elbow 186 to the discharge conduit. In a small collector assembly of the type shown in FIG. 13, only one short length 188 of woven fabric tubing is needed for bleeding air out of the collector assembly, since the interiors of collector tubes 182 and 184 are in communication with each other through T connector 180.

Various collector configurations other than those specifically described may of course be used, and numerous modifications can be made to the collectors themselves, or to the lagoon or other body of water itself without departing from the scope of the invention as defined in the following claims.

We claim:

1. In an open body of water having inlet means for directing water into said body and a discharge conduit for carrying water out of said body, said conduit being arranged to maintain a substantially uniform water level therein, said body having a substantially quiescent zone extending from the floor to the surface thereof, an improved collector comprising: at least one elongated, substantially horizontal tube, each tube having an array of openings providing communication between its exterior and its interior, substantially all of said openings in each tube being confined to the underside of the tube and being of substantially uniform cross-sectional area, the cross-sectional area of each opening and the total cross-sectional area of all of the openings being such that, at the design flow rate, the velocity gradient at each opening is within the range of from approximately $10 \text{ sec}^{-1}$ to $200 \text{ sec}^{-1}$, and the openings being distributed over an area on each tube such that the total area is substantially greater than the cross-sectional area of the discharge conduit, each tube being located with its entire array of openings submerged to a depth below the algal zone in said body and within said quiescent zone, and each tube having packing material within its interior providing labyrinthine passages adjacent substantially all of its openings for promoting uniformity of flow of water through the openings into the interior of the tube, and means for connecting the interior of each tube to said discharge conduit.

2. The improvement according to claim 1 in which each tube is located with its entire array of openings above the settling zone at the bottom of said quiescent zone.

3. The improvement according to claim 1 in which the body of water is a facultative aerated lagoon.

4. The improvement according to claim 1 in which the packing material for providing labyrinthine passages comprises biological reaction media providing a surface for the growth of nitrifying bacteria packed within each tube.

5. The improvement according to claim 1 in which the body of water is a facultative aerated lagoon, in which the packing material for providing labyrinthine passages comprises biological reaction media providing a surface for the growth of nitrifying bacteria packed within each tube, and in which each tube is located with its entire array of openings above the settling zone at the bottom of said quiescent zone, and including means for backwashing said media to deposit nitrate-containing solid material from the interior of each tube into said settling zone for anaerobic denitrification therein.

6. The improvement according to claim 1 in which the means for connecting the interior of each tube to said discharge conduit comprises at least one vertically disposed pipe, elbow means connecting the upper end of said pipe to one end of at least one elongated, substantially horizontal tube of the collector, and means connecting the lower end of said pipe to said discharge conduit, the last-mentioned connecting means being at least partially buried underneath a wall of said body of water, and said vertically disposed pipe serving to support said one end of the tube to which it is connected at a predetermined position within said body of water.

7. The improvement according to claim 1 in which the body of water is a facultative aerated lagoon, in which the packing material for providing labyrinthine passages comprises biological reaction media providing a surface for the growth of nitrifying bacteria packed within each tube, and in which each tube is located with its entire array of openings above the settling zone at the bottom of said quiescent zone, and including means for backwashing said media to deposit nitrate-containing solid material from the interior of each tube into said settling zone for anaerobic denitrification therein, said backwashing means comprising an air conduit for delivering air under pressure to the interior of each elongated, substantially horizontal tube of the collector.

8. The improvement according to claim 1 in which the body of water is a facultative aerated lagoon, in which the packing material for providing labyrinthine passages comprises biological reaction media providing a surface for the growth of nitrifying bacteria packed within each tube, and in which each tube is located with its entire array of openings above the settling zone at the bottom of said quiescent zone, and including means for backwashing said media to deposit nitrate-containing solid material from the interior of each tube into said settling zone for anaerobic denitrification therein, said backwashing means comprising an air conduit for delivering air under pressure to the interior of each elongated, substantially horizontal tube of the collector, and restricting means in communication with the interior of each tube for slowly bleeding air out of the tube following backwashing.

9. The improvement according to claim 8 in which said restricting means comprises a length of tubular woven fabric.

10. The improvement according to claim 1 in which each tube is located with its entire array of openings submerged to a depth of at least approximately one meter below the surface of the water in said body.

11. The improvement according to claim 1 in which each tube is located with its entire array of openings submerged to a depth of at least approximately two meters below the surface of the water in said body.

12. The improvement according to claim 1 in which each tube is located with its entire array of openings at least approximately one meter above the floor of the body of water.

13. The improvement according to claim 1 in which the body of water is a facultative aerated lagoon having a depth in excess of approximately three meters in its quiescent zone and in which each tube is located with its entire array of openings submerged to a depth of at least approximately two meters below the surface of the water in said body and located at least approximately one meter above the floor of said body in the quiescent zone.

14. The improvement according to claim 1 in which said collector comprises at least two substantially horizontal tubes connected in series.

15. The improvement according to claim 1 in which said collector comprises at least two substantially horizontal tubes connected in parallel.

16. The improvement according to claim 1 in which the velocity gradient at the design flow rate is within the range from approximately $10 \text{ sec}^{-1}$, to $100 \text{ sec}^{-1}$.

17. A method of water treatment comprising directing water into an open body of water, maintaining a substantially uniform water level therein, establishing a substantially quiescent zone in said body extending from the floor to the surface thereof, and discharging water from said body through a collector located in said quiescent zone, said collector comprising at least one elongated, substantially horizontal tube, each tube having an array of openings providing communication between its exterior and its interior, substantially all of said openings in each tube being confined to the underside of the tube and being of substantially uniform cross-sectional area, the cross-sectional area of each opening and the total cross-sectional area of all of the openings being such that, at the rate of flow of water through said collector, the velocity gradient at each opening is less than approximately $200 \text{ sec}^{-1}$, and the openings being distributed over an area on each tube such that the total area is substantially greater than the cross-sectional area of the discharge conduit, each tube being located with its entire array of openings submerged to a depth below the algal zone in said body and within said quiescent zone, and each tube having packing material within its interior providing labyrinthine passages adjacent substantially all of its openings for promoting uniformity of flow of water through the openings into the interior of the tube.

18. The method according to claim 17 in which the velocity gradient at each opening is less than approximately $100 \text{ sec}^{-1}$.

* * * * *